(12) United States Patent
Shah et al.

(10) Patent No.: US 8,452,626 B2
(45) Date of Patent: May 28, 2013

(54) TECHNOLOGY REPLACEMENT COST ESTIMATION USING ENVIRONMENTAL COST CONSIDERATIONS

(75) Inventors: Amip J. Shah, Santa Clara, CA (US); Chandrakant Patel, Fremont, CA (US); Cullen E. Bash, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

(21) Appl. No.: 12/538,454

(22) Filed: Aug. 10, 2009

(65) Prior Publication Data
US 2011/0035243 A1 Feb. 10, 2011

(51) Int. Cl.
*G06Q 10/00* (2012.01)
(52) U.S. Cl.
USPC ............ 705/7.11; 705/7.37; 702/34; 702/182
(58) Field of Classification Search
USPC ........................ 705/7.11, 7.37; 702/34, 182
See application file for complete search history.

(56) References Cited

U.S. PATENT DOCUMENTS

| | | | |
|---|---|---|---|
| 6,411,908 B1* | 6/2002 | Talbott | 702/34 |
| 6,581,045 B1* | 6/2003 | Watson | 705/400 |
| 6,785,592 B1* | 8/2004 | Smith et al. | 700/291 |
| 2003/0172002 A1* | 9/2003 | Spira et al. | 705/27 |
| 2008/0140352 A1* | 6/2008 | Goebel et al. | 702/183 |
| 2008/0168015 A1* | 7/2008 | Thie et al. | 706/46 |
| 2009/0201293 A1* | 8/2009 | Tung et al. | 345/440 |
| 2009/0204916 A1* | 8/2009 | Benedek et al. | 715/764 |
| 2009/0234705 A1* | 9/2009 | Brunschwiler et al. | 705/10 |

OTHER PUBLICATIONS

Heat Transfer Research; Studies from Hewlett-Packard yield new data on heat transfer research. Anonymous. Technology News Focus. Atlanta: Jun 2, 2008. p. 198.*
Exergy, Wikipedia. Published Oct. 26, 2007. Retrieved from http://web.archive.org/web/20071026022738/http://en.wikipedia.org/wiki/Exergy on Apr. 11, 2012. 10 pgs.*
Feng, Ming, Ph.D., An exergy based engineering and economic analysis of sustainable building. Florida International University, 2008 , 214 pages. (Abstract only, 2 pgs.).*
Heat Transfer Research; Studies from Hewlett-Packard yield new data on heat transfer research. Anonymous. Technology News Focus. Atlanta: Jun. 2, 2008. p. 198.*
Wall, G., "Exergy, Ecology and Democracy-Concepts of a Vital Society or a Proposal for an Exergy Tax", http://exergy.se/goran/eed/index.html, downloaded Jun. 16, 2008.
Patel, C. D. et al., "Energy Flow in the Information Technology Stack: Coefficient of Performance of the Ensemble and its Impact on the Total Cost of Ownership", Mar. 2006.
Patel, C. D. et al., "Cost Model for Planning, Development and Operation of a Data Center", HPL-2005-107(R.1), Jun. 2005.
Hertwich, E. G., et al., "Evaluating the Environmental Impact of Products and Production Processes: a Comparison of Six Methods", Oct. 1996.

* cited by examiner

*Primary Examiner* — Lynda Jasmin
*Assistant Examiner* — Timothy Padot (57) ABSTRACT

In a method of estimating a replacement cost associated with an existing technology performed by a processor, one or more costs associated with implementing the existing technology are obtained, in which the one or more costs include an environmental cost and a utility cost associated with implementing the existing technology. In addition, an existing net benefit of continuing implementation of the existing technology based upon the obtained one or more costs are calculated.

12 Claims, 5 Drawing Sheets

TECHNOLOGY REPLACEMENT COST ESTIMATION USING ENVIRONMENTAL COST CONSIDERATIONS

CROSS REFERENCE TO RELATED APPLICATIONS

The present application shares some common subject matter with PCT Application No. PCT/US08/57040, filed on Mar. 14, 2008, by Amip Shah et al.; PCT Application No. PCT/US07/85602, filed on Nov. 27, 2007, by Amip J. Shah et al.; U.S. Provisional Patent Application No. 60/990,438, filed on Nov. 27, 2007, by Amip J. Shah et al.; and U.S. patent application Ser. No. 12/237,695, filed on Sep. 25, 2008, by Amip J. Shah et al. The disclosures of which are hereby incorporated by reference in their entireties.

BACKGROUND

Decisions on whether to replace an apparatus for performing work are typically made based upon the direct economic cost of the replacement or when the apparatus' functionality has been lost. Thus, for instance, an apparatus is typically replaced when the acquisition costs of a new apparatus is below some user-defined budgetary threshold or when the apparatus ceases to work. The budgetary threshold used to determine when the apparatus is to be replaced may involve other factors, such as, the depreciation or amortization of the existing apparatus and the potential for activity enabled by the new apparatus. As such, the decision of whether and when to replace the apparatus is entirely user-initiated, and is often based purely on functionality.

The user-initiated decision is thus highly subjective and thus lacks a robust quantitative consideration. Accordingly, the timing at which apparatuses are replaced often lacks optimization and thus apparatuses are often replaced before the apparatuses have been implemented for their entire useful lifetimes or after the apparatuses have exceeded their usefulness as compared with benefits available from new apparatuses.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and apparatus for estimating a replacement cost associated with an existing technology and for determining whether to replace the existing technology with a new technology based upon environmental costs and utilities associated with the technologies. The environmental costs of the technologies may include one or more costs associated with exergy (or sustainability), carbon emissions, energy efficiency, etc. Thus, for instance, the environmental costs may include costs determined from a life-cycle analysis of the technologies.

Generally speaking, "exergy" is synonymous with "available energy" and may be defined as a measure of the amount of work a system has the ability of performing. In comparison with energy, which cannot be destroyed because it merely goes from one state to another, exergy, or available energy, is typically destroyed as the system performs work, and thus addresses both energy and material consumption. More particularly, the second law of thermodynamics necessitates the presence of irreversibilities (or entropy) in any real, physical system. These irreversibilities essentially reduce the amount of work that may be available for utilization by the system. These irreversibilities lead to destruction of available energy or resources (that is, exergy). For example, the process of converting coal into electricity is an irreversible process and the conversion, therefore, corresponds to a destruction of exergy.

Figure 1:
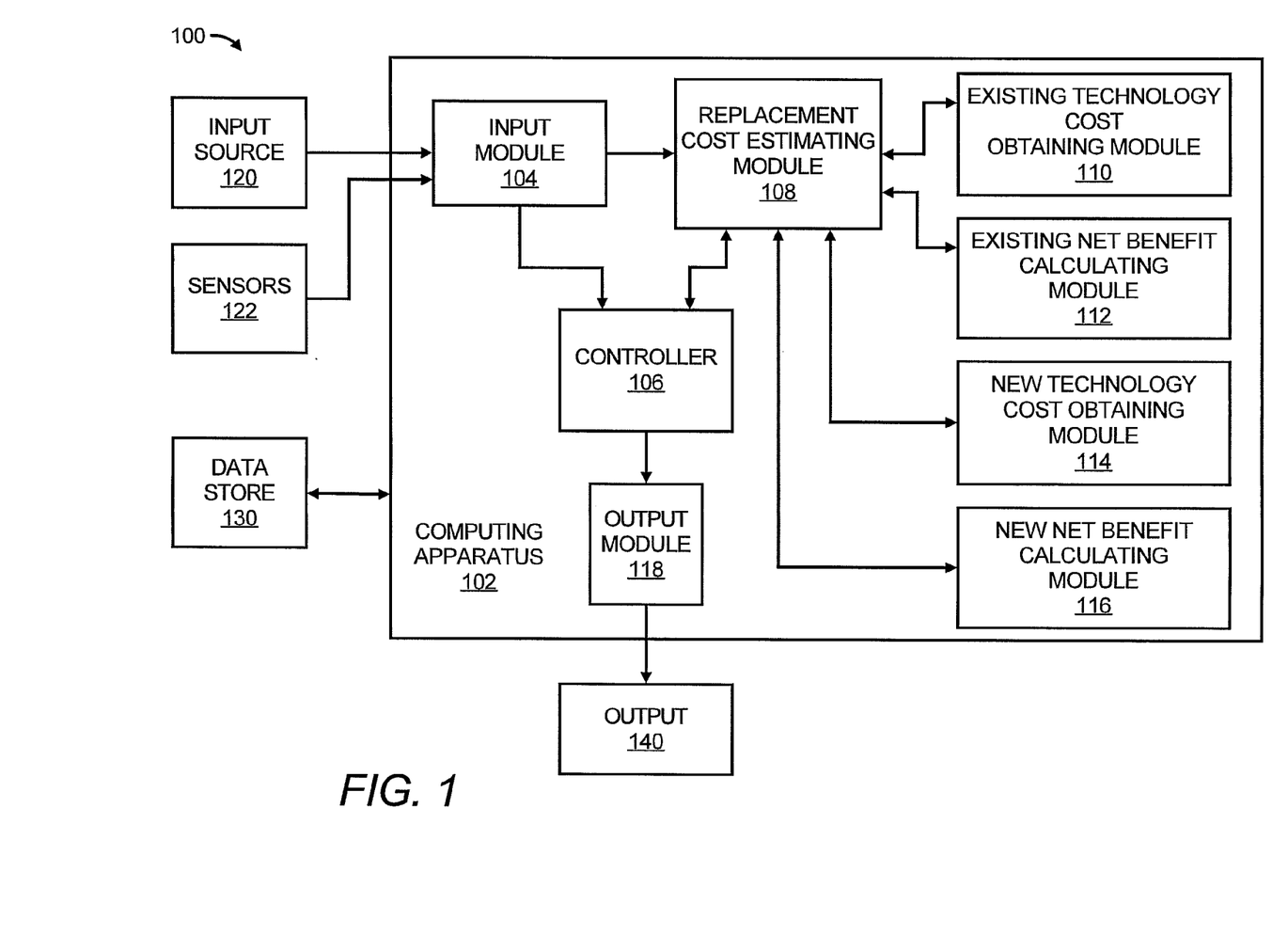
FIG. 1 shows a simplified block diagram of a system for automatically estimating a replacement cost for an existing technology that considers environmental costs and utility costs, according to an embodiment of the invention.

With reference first to FIG. 1, there is shown a simplified block diagram of a system 100 for automatically estimating a replacement cost for an existing technology that considers environmental costs and utility costs, according to an example. It should be understood that the system 100 may include additional elements and that some of the elements described herein may be removed and/or modified without departing from the scope of the system 100.

As shown, the system 100 includes a computing apparatus 102, an input source 120, sensors 122, a data store 130, and an output 140. The computing apparatus 102 may comprise any apparatus capable of performing computing functions, including, a personal computer, a server, a laptop computer, a handheld computer, a smart-phone, etc. The computing apparatus 102 is also depicted as including an input module 104, a controller 106, a replacement cost estimating module 108, an existing technology cost obtaining module 110, an existing net benefit calculating module 112, a new technology cost obtaining module 114, a new net benefit calculating module 116, and an output module 118.

The modules 108-116 may comprise software, firmware, or hardware or a combination thereof. In instances where the modules 108-116 comprises software, the modules 108-116 may be stored on a computer readable storage medium and may be executed by the controller 106, which may comprise a processor. In these instances, the modules 108-116 may comprise software modules or other programs or algorithms configured to perform the functions described herein below. In instances where the modules 108-116 comprise firmware or hardware, the modules 108-116 may comprise circuit or other hardware modules configured to perform the functions described herein below.

Although the existing technology cost obtaining module 108 and the new technology cost obtaining module 114 have been depicted as forming separate components, it should be understood that a single cost obtaining module may be implemented in place of both of the existing technology cost obtaining module 108 and the new technology cost obtaining module 114 without departing from a scope of the system 100. Likewise, a single net benefit calculating module may be implemented in place of both of the existing net benefit calculating module 112 and the new net benefit calculating module 116 without departing from a scope of the system 100. In addition, although the modules 110-116 have been depicted as communicating with the replacement cost estimating module 108, some or all of the module 110-116 may be configured to communicate directly with each other without departing from a scope of the system 100.

The technology discussed herein may comprise any suitable software and/or apparatus that may be replaced over a course of time in which the software and/or apparatus is implemented. By way of example, the technology may include software, such as, software applications used in personal and/or business environments. Other examples of suitable technology include, a server, a desktop computer, a laptop computer, a printing device, an automobile, an airplane, a train, a cellular telephone, a building, a data center, an air conditioning unit, etc. It should thus be understood that the "technology" discussed herein may encompass any of a number of different types of entities.

As described in greater detail herein below, the computing apparatus 102, and more particularly, the controller 106, is configured to implement a method of automatically estimating a replacement cost associated with an existing technology. In addition, the computing apparatus 102, and more particularly the controller 106, is configured to implement the method to automatically determine whether or when the existing technology should be replaced with a new technology. Thus, the new technology discussed herein comprises one or more technologies that are capable of replacing the existing technology.

In performing the methods disclosed herein, the computing apparatus 102 is configured to receive input from an input source 120, which may comprise a computing device, a database containing various information stored on a data store, a user input source, such as, a keyboard, mouse, etc., or other source through which information may be inputted into the computing apparatus 102 through the input module 104. Thus, the input source 120 may comprise a device that is peripherally connected to the computing apparatus 102 or the input source 120 may be connected to the computing apparatus 102 through a network connection, such as, a local area network connection, a wide area network connection, the Internet, etc. Alternatively, the input source 120 may be integrated with the computing apparatus 102.

The input source 120 may input data pertaining to, for instance, various costs associated with implementing existing technologies, various costs associated with procuring and implementing new technologies, useful work performed or predicted to be performed by the existing and new technologies, lifetimes of the existing technologies, time required to procure new technologies, various weighting coefficients for aspects of the existing and new technologies, power consumption information of the existing and new technologies, costs associated with disposing existing and new technologies, etc. The costs may be defined in terms of both financial and environmental costs. The environmental costs may include environmental costs associated with life-cycle environmental costs of either or both of the existing technologies and the new technologies.

The computing apparatus 102 may also receive input from one or more sensors 122, which are configured to detect one or more conditions associated with the existing and/or new technologies. The one or more conditions may include, for instance, temperature, pressure, humidity, volume flow rate, etc. In addition, or alternatively, the one or more sensors 122 may be configured to detect the amount of power consumed by the existing technologies. Alternatively, "synthetic" sensors, such as those that determine states related to software implementation, the expected revenue from a particular application, or higher-order metrics related to the considered apparatus, may also be included. According to an example, the computing apparatus 102 is configured to implement the data received from the one or more sensors 122 in determining one or both of the financial and environmental costs associated with implementing the existing technologies, as discussed in greater detail herein below.

In any regard, the input module 104 is configured to receive input from the input source 120 and the one or more sensors 122. According to an example, the input module 104 may provide a graphical user interface through which a user may provide instructions to the computing apparatus 102. In addition, the input received by the input module 104 may be stored in the data store 130, which may comprise a combination of volatile and non-volatile memory, such as DRAM, EEPROM, MRAM, flash memory, and the like. In addition, or alternatively, the data store 130 may comprise a device configured to read from and write to a removable media, such as, a floppy disk, a CD-ROM, a DVD-ROM, or other optical or magnetic media.

The replacement cost estimating module 108 is configured to receive or obtain input data received through the input module 104. The replacement cost estimating module 108 also interfaces with the existing technology cost obtaining module 110, which obtains various cost information associated with implementing the existing technology that the replacement cost estimating module 108 implements in estimating a replacement cost of the existing technology. According to an example, the replacement cost estimating module 108 is configured to calculate exergy loss values associated with continuing implementation of the existing technology by implementing thermodynamic properties of the existing technology as discussed, for instance, in PCT Application No. PCT/US08/57040.

The replacement cost estimating module 106 also interfaces with the existing net benefit calculating module 112, which is configured to calculate a net benefit associated with implementing the existing technology. In calculating the existing net benefit, the existing net benefit calculating module 112 is configured to factor one or more environmental impact costs associated with implementing the existing technology. The replacement cost estimating module 106 may employ the existing net benefit calculated by the existing net benefit calculating module 112 in determining the replacement cost of the existing technology.

The replacement cost estimating module 108 also interfaces with the new technology cost obtaining module 114, which obtains various cost information associated with at least one of procuring and implementing a new technology that is capable of replacing the existing technology. The replacement cost estimating module 108 may implement the various cost information in determining whether to replace the existing technology with the new technology. According to an example, the replacement cost estimating module 108 is configured to calculate exergy loss values associated with replacing the existing technology with the new technology.

The replacement cost estimating module 106 also interfaces with the new net benefit calculating module 116, which is configured to calculate a net benefit associated with at least one of procuring and implementing the new technology. In calculating the new net benefit, the new net benefit calculating module 116 is configured to factor one or more environmental impact costs associated with at least one of procuring and implementing the new technology. The replacement cost estimating module 106 may employ the new net benefit calculated by the new net benefit calculating module 112 in determining whether to replace the existing technology with the new technology.

In one example, the controller 106 is configured to output data relating to the replacement cost of the existing technology or a recommendation on whether to keep the existing technology or replace the existing technology with a new technology to an output 140 through the output module 118. The output 140 may comprise, for instance, a display configured to display the outputted data, a fixed or removable storage device on which the outputted data is stored, a connection to a network over which the outputted data is communicated, etc.

According to an example, the replacement cost estimating module 108 is configured to predict through a priori estimates when an existing technology should be replaced. By way of example, a printer may employ the replacement cost estimating module 108 to determine in advance when it becomes economically or environmentally feasible to replace an ink cartridge. As another example, given a specific failure rate, the replacement cost estimating module 108 may be configured to determine in advance of an optimal time to replace a failed component, for instance, a hard disk drive in a computing device, and whether it is more economically or environmentally feasible to then replace just the failed component or the entire system. Thus, for instance, the replacement cost estimating module 108 may be configured to determine optimized useful remaining lifetimes of existing apparatuses through application of modeling techniques. In addition, the replacement cost estimating module 108 may be configured to identify new technologies that result in optimized new net benefits.

Examples of methods in which the computing apparatus 102 may be employed to determine replacement costs associated with existing technologies and/or to determine whether to replace an existing technology with a new technology, will now be described with respect to the following flow diagrams of the methods 200 and 300 depicted in FIGS. 2, 3A, and 3B. It should be apparent to those of ordinary skill in the art that the methods 200 and 300 represent generalized illustrations and that other steps may be added or existing steps may be removed, modified or rearranged without departing from the scopes of the methods 200 and 300.

The descriptions of the methods 200 and 300 are made with reference to the system 100 illustrated in FIG. 1, and thus makes reference to the elements cited therein. It should, however, be understood that the methods 200 and 300 are not limited to the elements set forth in the system 100. Instead, it should be understood that the methods 200 and 300 may be practiced by a system having a different configuration than that set forth in the system 100.

Figure 2:
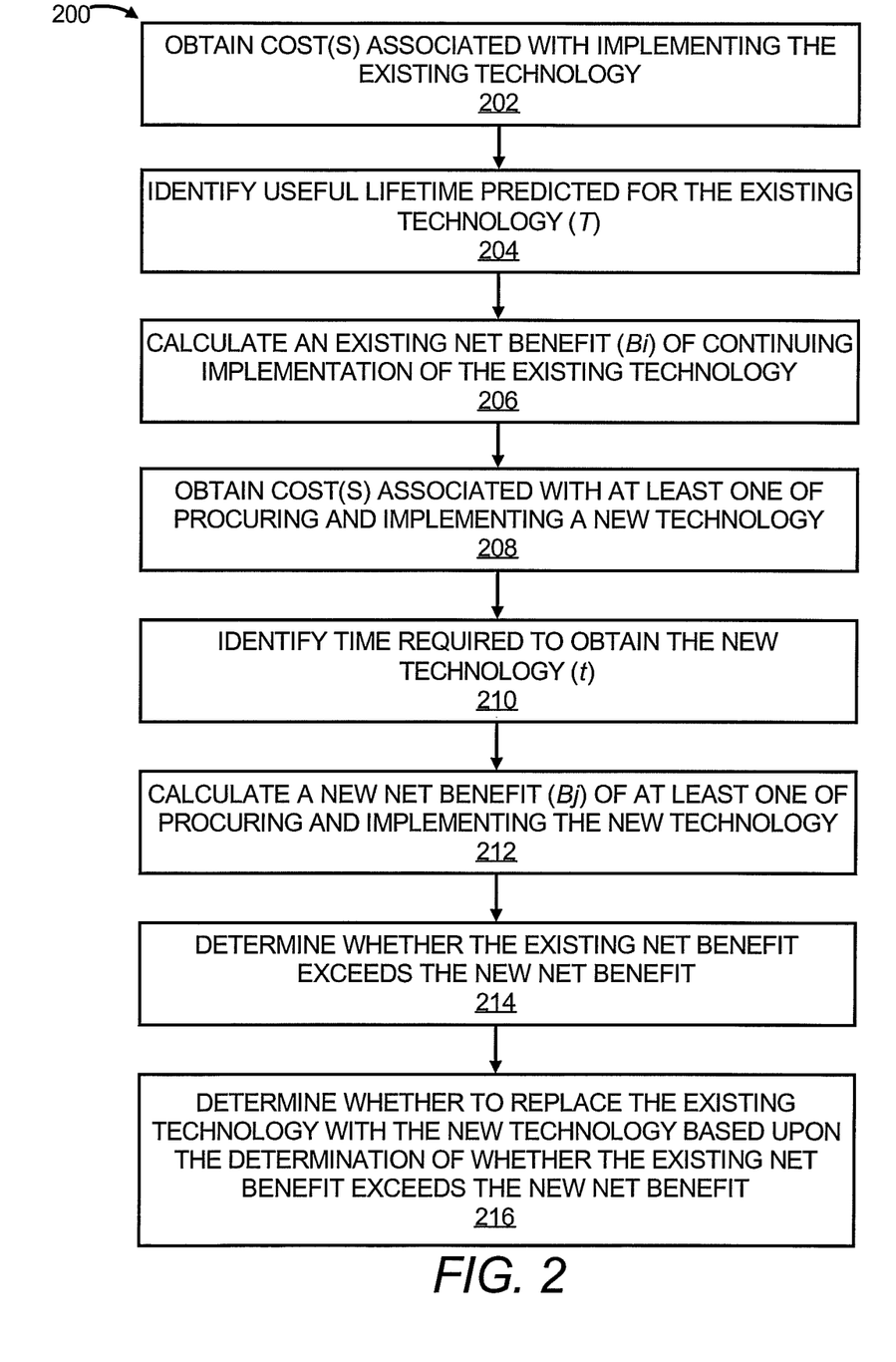
FIG. 2 shows a flow diagram of a method of estimating a replacement cost associated with an existing technology and determining whether to replace the existing technology with a new technology, according to an embodiment of the invention.

With reference first to FIG. 2, there is shown a flow diagram of a method 200 of estimating a replacement cost associated with an existing technology, which may also include a determination of whether to replace the existing technology with a new technology based upon the estimated replacement cost, according to an example. As shown in FIG. 2, at step 202, the controller 106 implements the existing technology cost obtaining module 110 to obtain one or more costs associated with implementing the existing technology. At least one of the one or more costs includes an environmental cost associated with implementing the existing technology. Examples of suitable environmental costs include, exergy, carbon emissions, energy consumption levels, energy efficiencies, etc. In addition, the existing technology cost obtaining module 110 may obtain the one or more costs from a database, from information contained in user inputted data, etc.

At step 204, the controller 106 implements the replacement cost estimating module 108 to identify a useful lifetime remaining until the existing technology is likely to stop producing useful work. The replacement cost estimating module 108 may determine the useful lifetime remaining for the existing technology from information received from a user or through a prediction of the useful lifetime remaining, as discussed herein below. In addition, the controller 106 may implement the replacement cost estimating module 108 to identify an amount of useful work that the existing technology is likely to perform over a given amount of time, such as, per year. In an example of a computer system, the useful work may be measured in terms of a computational performance metric, such as the number of instructions processed per second, the total number of instructions processed per year, etc. In an example with other types of systems, similar performance metrics may be measured, such as, for a vehicle, the number of miles driven per year; for a telephone, the number of hours of talktime per year, etc.

At step 206, the controller 110 implements the existing net benefit calculating module 112 to calculate an existing net benefit of continuing implementation of the existing technology based upon the obtained one or more costs. In calculating the existing net benefit, the existing net benefit calculating module 112 is configured to calculate a total useful work that the existing technology is predicted to have remaining in the identified useful lifetime remaining for the existing technology. More particularly, for instance, the existing net benefit calculating module 112 is configured to calculate the total useful work as a function of the identified useful lifetime remaining and the useful work produced by the existing technology over a predetermined period of time.

The function may also include a weighting coefficient that is selected as a function of operation policy. For instance, in instances where performance of the existing technology is the most critical, the weighting coefficient may be relatively high. In other instances where the production of useful work is not as critical, such as with non-critical workloads, the weighting coefficient may be relatively low. As other examples, the weighting coefficient may be defined as some arbitrary constant value, as a function of other dependent variables, such as, time of day, prior lifecycle history, functional criticality, etc.

By way of particular example, the total useful work (U) remaining of the existing technology (i) may be calculated through the following equation:

$$U_i = W_{i1} \times u_i \times T.$$  Equation (1):

In Equation (1), $u_i$ is the useful work that the ith existing technology is predicted to perform over a given period of time, T is the identified useful lifetime remaining for the ith existing technology, and $W_{i1}$ is the weighting coefficient applied to the ith existing technology.

In addition, the existing net benefit calculating module 112 is further configured to calculate a cost of operation of the existing technology as a function of a direct operational cost of the existing technology (which may include, for instance, the power consumption of the existing technology), the identified useful lifetime remaining, and a weighting coefficient for cost. The weighting coefficient for cost may also be selected as a function of operation policy. Thus, for instance, the weighting coefficient may be relatively higher when the financial costs of operating the existing technology is more critical than, for example, the amount of useful work that the existing technology is able to perform over a given period of time.

By way of particular example, the cost (C) associated with performing the total work ($U_i$) by the ith existing technology may be calculated through the following equation:

$$C_i = W_{i2} \times O_i \times T. \qquad \text{Equation (2):}$$

In Equation (2), $O_i$ is the direct operational cost of the ith existing technology per unit time, T is the identified useful lifetime remaining for the ith existing technology, and $W_{i2}$ is a weighting coefficient applied to the Ah existing technology. The direct operational cost ($O_i$) of the ith existing technology may include, for instance, one or more of electricity costs, maintenance costs, lifetime exergy, carbon emissions, etc.

The existing net benefit calculating module 112 is further configured to calculate the existing net benefit as a function of the calculated total useful work, the cost of operation, and a third weighting coefficient. By way of example, the existing net benefit calculating module 112 is configured to calculate the net benefit ($B_i$) achievable by operating the existing technology over its remaining lifetime may be evaluated as:

$$B_i = f(U_i, C_i, \underline{W}). \qquad \text{Equation (3):}$$

By way of particular example, the net benefit may be determined according to the following equation:

$$B_i = (\underline{W}_{i1} \times U_i)/(W_{i2} \times C_i). \qquad \text{Equation (4):}$$

Although the function in Equation (4) has been described as a quotient, other functions may be applied to determine the net benefit. For instance, instead of the quotient, a subtraction or multiplication may be applied. In addition, both the total useful work ($U_i$) and the total cost ($C_i$) may change as a function of time as the utility of the existing technology diminishes.

In Equations (3) and (4), W represents a weighting coefficient and may be a single- or multi-dimensional weighting matrix that may be used to bias the net benefit in terms of either utility or cost, depending on, for instance, operational policy. For instance, if performance is critical, the benefit may be weighted more towards the useful work ($U_i$); however, if energy efficiency is critical, the benefit may be weighted more towards the cost ($C_i$). In addition, or alternatively, the weighting coefficient W may be defined independently, as a function of operating principle, as some function of the previous weighting coefficients ($W_{i1}$, $W_{i2}$), etc. The different components of the weighting coefficient W may also be selected as a unit-dependent set of parameters, for instance, a first weighting coefficient $W_{i1}$ may be a Joules/Performance multiplier and a second weighting coefficient $W_{i2}$ may be a unitless multiplier, thus giving the existing net benefit $B_i$ in terms of Joules.

Although the method 200 may end following determination of the existing net benefit calculation for the existing technology, the method 200 may also continue with a determination of a new net benefit for a new technology that is capable of replacing the existing technology. In this regard, at step 208, the controller 106 may implement the new technology cost obtaining module 114 to obtain one or more costs associated with at least one of procuring and implementing a new technology that is capable of replacing the existing technology. At least one of the one or more costs includes an environmental cost associated with at least one of procuring and implementing the new technology. Examples of suitable environmental costs include, exergy, carbon emissions, energy consumption levels, etc. In addition, the new technology cost obtaining module 114 may obtain the one or more costs from a database, from information contained in user inputted data, etc.

At step 210, the controller 106 implements the replacement cost estimating module 108 to identify a length of time predicted to be required in obtaining the new technology. The replacement cost estimating module 108 may identify the length of time predicted to be required from information received from a user or through access to a database containing the information. The length of time predicted to be required in obtaining the new technology may include, for instance, time in which the new technology will be in research and development, time in which the new technology will be in manufacturing, time to ship and install the new technology, etc.

At step 212, the controller 106 implements the new net benefit calculating module 116 to calculate a new net benefit of at least one of procuring and implementing the new technology. In calculating the new net benefit, the controller 106 may implement the replacement cost estimating module 108 to identify an amount of useful work ($u_j$) that the new technology (j) is likely to perform during a period of time between when the new technology will be available (t) and the identified length of time that the existing technology is predicted to have remaining (T) to perform useful work. By way of example, the useful work that the new technology is likely to perform during that period of time may be calculated from the following equation:

$$U_j = W_{j1} \times u_j \times (T-t). \qquad \text{Equation (5):}$$

In Equation (5), the $W_{j1}$ represents a weighting coefficient, which may be selected in a manner similar to any of the manners discussed above with respect to the weighting coefficient $W_{i1}$. In an example of a computer system, the useful work ($U_j$) of a new computer system may be measured in terms of a computational performance metric, such as the number of instructions processed per second, the total number of instructions processed per year, etc., that the new computer system is able to perform between the time period (T–t).

In addition, the new net benefit calculating module 116 is further configured to calculate a cost of operation of the new technology (Cj) as a function of a cost of putting the new technology into operation ($I_j$) the direct cost of operation of the new technology per unit time ($O_j$), the time period (T–t), and the cost of disposing the existing technology ($D_i$), for instance, according to the following equation:

$$C_j = W_{j2} \times I_j + W_{j3} \times O_j \times (T-t) + W_{j4} \times D_i. \qquad \text{Equation (6):}$$

In Equation (6), the weighting coefficients $W_j$ may be selected in a manner similar to any of the manners discussed above with respect to the weighting coefficient $W_{i1}$ and may thus be selected based upon desired criticalities of the different costs. Thus, for instance, the weighting coefficients may be selected as a function of operational principle, sustainability drivers, cost considerations, etc. For example, the weighting coefficient $W_{j3}$ may have a higher value if operational costs are important, $W_{j4}$ may be selected to have a higher value if the amount of recycled materials recovered from scrap is important, and $W_{j2}$ may have a higher value if the fixed costs are important.

In addition, the cost of putting the new technology into operation ($I_j$) may include one or more environmental costs, such as, exergy costs, energy consumption costs, carbon emissions, etc. By way of example, the cost of putting the new technology into operation, such as to procure the new technology, may include the costs associated with extracting the materials required to fabricate the new technology, costs associated with manufacturing and transporting the new technology, human costs associated with installing the new technology, etc. Moreover, the time period to procure the new technology (t) may vary depending upon the new technology. For instance, the time period (t) may be relatively short when the new technology comprises an off-the-shelf server and relatively long when the new technology comprises a new building or data center.

In addition, the cost associated with disposing the existing technology ($D_i$) may also include environmental costs associated with the disposal of the existing technology. For instance, these costs may include costs associated with transporting and destroying the existing technology, which may include costs associated with recycling the existing technology. Moreover, in instances where the new technology is predicted to have a useful lifetime that is less than the identified length of time that the existing technology is predicted to have remaining (T) to perform useful work, the cost of disposing the new technology ($D_j$) are also required to be included in Equation (6).

Although Equation (6) has been described with the various cost components being added, the various cost components may be multiplied with each other without departing from a scope of the method 200. In addition, the various cost components may be selected as being fixed over time or a time varying value of money may be included in Equation (6).

The new net benefit calculating module 112 is further configured to calculate the new net benefit as a function of the calculated total useful work, the cost of operation, and a fifth weighting coefficient. By way of example, the new net benefit calculating module 116 is configured to calculate the new net benefit ($B_j$) achievable by operating the new technology may be evaluated as:

$$B_j = f(U_j, C_j, \underline{W}). \qquad \text{Equation (7):}$$

By way of particular example, the new net benefit may be determined according to the following equation:

$$B_j = (\underline{W}_{j1} \times U_j)/(\underline{W}_{j2} \times C_j). \qquad \text{Equation (8):}$$

Although the function in Equation (8) has been described as a quotient, other functions may be applied to determine the new net benefit. For instance, instead of the quotient, a subtraction or multiplication may be applied.

In Equations (7) and (8), W represents a weighting coefficient and may be a single- or multi-dimensional weighting matrix that may be used to bias the net benefit in terms of either utility or cost, depending on, for instance, operational policy. For instance, if performance is critical, the benefit may be weighted more towards the useful work ($U_j$); however, if energy efficiency is critical, the benefit may be weighted more towards the cost ($C_j$). In addition, or alternatively, the weighting coefficient $\underline{W}$ may be defined independently, as a function of operating principle, as some function of the previous weighting coefficients ($W_{j1}$, $W_{j2}$), etc. The different components of the weighting coefficient $\underline{W}$ may also be selected as a unit-dependent set of parameters, for instance, a first weighting coefficient $W_{j1}$ may be a Joules/Performance multiplier and a second weighting coefficient $W_{j2}$ may be a unitless multiplier, thus giving the new net benefit $B_j$ in terms of Joules.

At step 214, the controller 106 implements the replacement cost estimating module 108 to determine whether the existing net benefit ($B_i$) exceeds the new net benefit ($B_j$). Based upon this determination, the controller 106 further implements the replacement cost estimating module 108 to determine whether to replace the existing technology with the new technology, as indicated at step 216. More particularly, at step 216, the controller 106 may determine it will be beneficial to continue to implement the existing technology in response to a determination that the existing net benefit ($B_i$) exceeds the new net benefit ($B_j$). However, if the controller 106 determines that the existing net benefit ($B_i$) falls below the new net benefit ($B_j$), the controller 106 may determine that it will be beneficial to replace the existing technology with the new technology at step 216. If the existing net benefit ($B_i$) equals the new net benefit ($B_j$), the controller 106 may determine that either option is feasible.

In addition, the controller 106 may output the determination made at step 216 to the output 140 as discussed above.

Figure 3A:
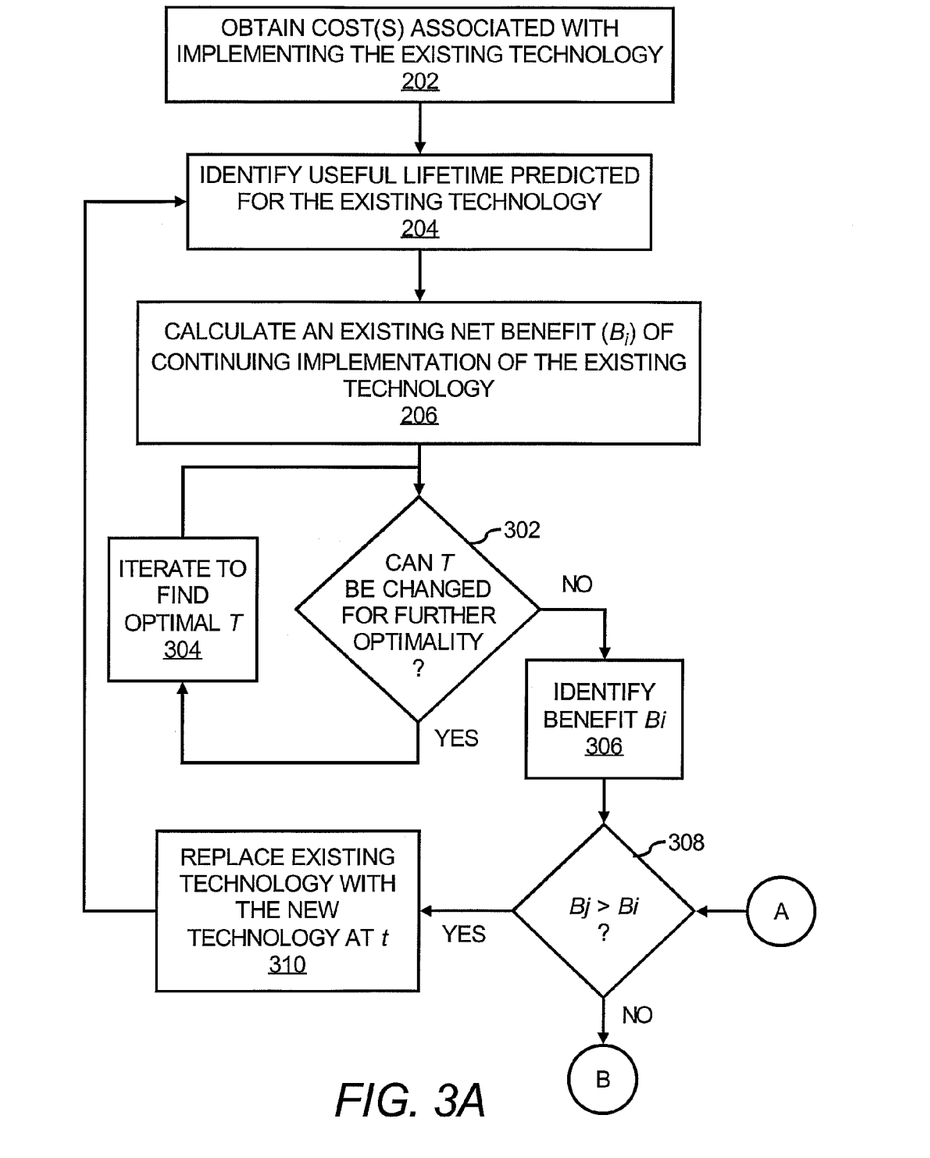
FIGS. 3A and 3B, collectively show a flow diagram of a method of estimating a replacement cost associated with an existing technology, which may also include a determination of whether to replace the existing technology with a new technology based upon the estimated replacement cost, according to another embodiment of the invention.
Figure 3B:
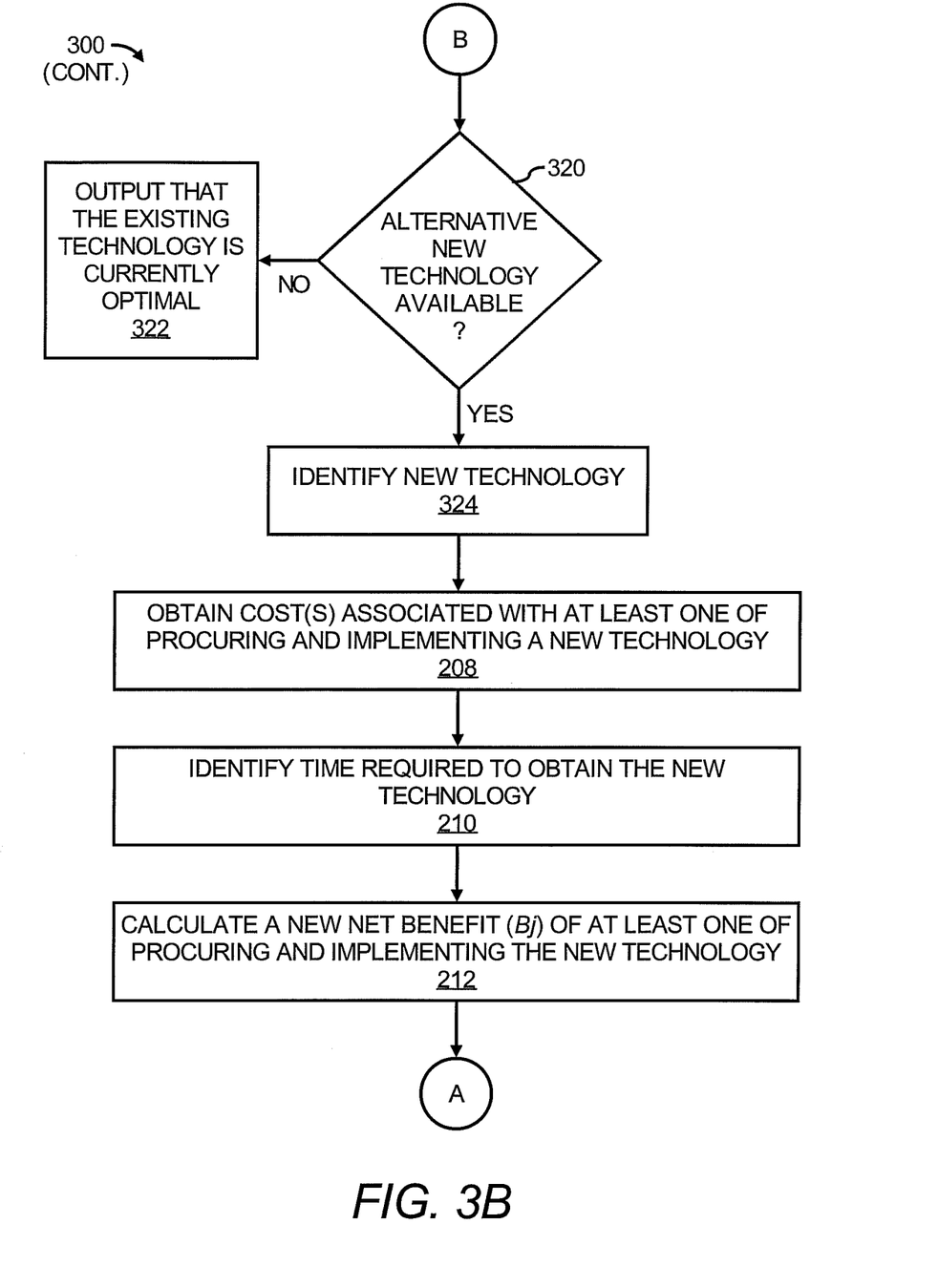

Turning now to FIGS. 3A and 3B, there is collectively shown a flow diagram of a method 300 of estimating a replacement cost associated with an existing technology, which may also include a determination of whether to replace the existing technology with a new technology based upon the estimated replacement cost, according to another example. Generally speaking, the method 300 is configured to enable a predictive determination of whether to replace the existing technology based upon an iteration using different lengths of time that the existing technology is predicted to provide usefulness and how the usefulness is likely to change over time. By way of particular example in which the existing technology comprises a server, the change over time may include that a larger number of people are predicted to access the server in two years, which will change the utility function of the server.

Based upon these types of assumptions, a model of the useful lifetime of the existing technologies may be developed, which may be employed to identify the useful lifetime for the existing technologies that results in an optimized net benefit ($B_i$. The model may be developed through application of an iterative process that may use a manual or automatic evaluation of various useful lifetimes and changes to the utilities of the existing technologies over time. By way of example, the iterative process may include an evaluation of the existing technologies over a period of years, at an increment of 1 year. In addition, simulation techniques may be employed to determine the optimized useful lifetimes (T) of the existing technologies.

The method 300 includes some of the same steps as those discussed above with respect to the method 200. As such, detailed descriptions of those steps having common reference numerals are omitted with respect to the method 300.

Thus, following step 206, at step 302, the controller 106 implements the replacement cost estimating module 108 to determine whether the identified useful lifetime (T) predicted for the existing technology may be changed for further optimality. The controller 106 may make this determination through an iteration of various useful lifetimes and changing utilities over time of the existing technology, as indicated at step 304 until the controller 106 identifies a useful predicted lifetime (T) for the existing technology that results in an optimized net benefit ($B_i$) of the existing technology at step 302. As discussed above, the controller 106 may develop and implement a model of the existing technology over the predicted useful lifetime to make this determination. In addition, the controller 106 may implement simulation techniques to speed up the process involved in making this determination.

If the controller 106 determines that the predicted useful lifetime (T) of the existing technology is not further optimizable, the controller 106 determines that the existing net benefit ($B_i$) resulting from the optimized predicted useful lifetime (T) is identified as the optimized existing net benefit ($B_i$) for the existing technology at step 306. In addition, at step 308, the controller 106 implements the replacement cost estimating module 108 to determine whether a new net benefit ($B_j$) of a new technology exceeds the optimized existing net benefit ($B_i$).

Prior to step 308, however, the controller 106 may implement the replacement cost estimating module 108 to determine the new net benefit ($B_j$) of a new technology through, for instance, implementation of steps 208-212 as shown in FIG. 3B. Again, a detailed description of steps 208-212 is omitted here because these steps were discussed with respect to FIG. 2.

The new technology to be considered as a replacement for the existing technology may be identified at step 324 based upon suitability of the new technology. For instance, if the existing technology comprises a server, the new technology identified at step 324 may comprise newer servers from the same or different manufacturers that are capable of performing at least all of the same functions as the existing technology. According to an example, the new technologies and information pertaining to the new technologies may be stored in a database and the controller 106 may access the database to identify the suitable new technologies and the cost information pertaining to the suitable new technologies.

With reference back to FIG. 3A, if the new net benefit ($B_j$) of the new technology exceeds the existing net benefit ($B_i$) of the existing technology, the controller 106 may output an indication that the existing technology is to be replaced with the new technology identified at step 324 at the time (t) that the new technology is available, as indicated at step 310. In addition, the new technology will become the existing technology and another determination of when and whether to replace the new technology may be determined through another iteration of the method 300.

If, however, the new net benefit ($B_j$) of the new technology falls below the existing net benefit ($B_i$) of the existing technology, the controller 106 may determine whether an alternative new technology is available at step 320. Again, the controller 106 may access a database containing information pertaining to candidate alternative new technologies to make this determination. In addition or alternatively, the controller 106 may receive this information from a user.

If, at step 320, the controller 106 determines that an alternative new technology is not available, the controller 106 may output an indication that the existing technology is currently optimal and should thus not be replaced at step 322. However, if the controller 106 determines that an alternative new technology is available, the controller 106 may identify the new technology at step 324 and may calculate a new net benefit ($B_j$) of the alternative new technology at steps 208-212. In addition, the controller 106 may again compare the new net benefit (Bj) with the existing net benefit ($B_i$) at step 308 and may perform certain ones of the steps following step 308 depending upon the comparison. In this regard, the controller 106 may iterate through alternative new technologies that have been deemed to be suitable replacements for the existing technology to identify if there is a suitable alternative new technology that provides greater benefit than the existing technology.

In addition, although not explicitly shown in FIGS. 3A and 3B, the controller 106 may iterate through some or all of the alternative new technologies to identify the alternative new technology that results in an optimized new net benefit. In this regard, similar to step 302, the controller 106 may determine an optimized new net benefit for the considered new technologies. Again, the controller 106 may implement simulation techniques to speed up the process in identifying the alternative new technology that results in the optimized new benefit.

Some or all of the operations set forth in the methods 200 and 300 may be contained as utilities, programs, or subprograms, in any desired computer accessible medium. In addition, the methods 200 and 300 may be embodied by computer programs, which can exist in a variety of forms both active and inactive. For example, they may exist as software program(s) comprised of program instructions in source code, object code, executable code or other formats. Any of the above may be embodied on a computer readable storage medium.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 4:
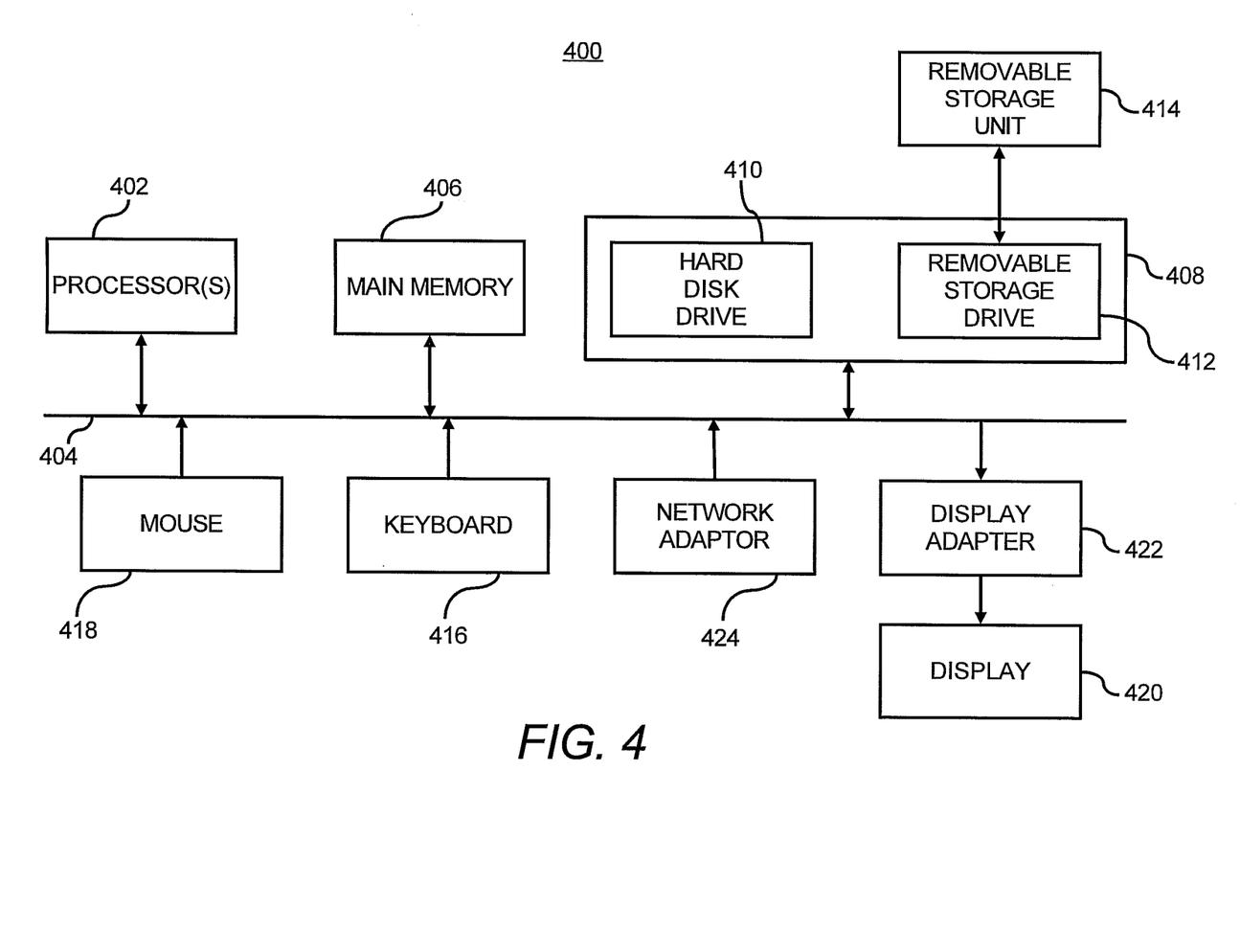
FIG. 4 shows a block diagram of a computing apparatus configured to implement or execute the method depicted in FIGS. 2, 3A, and 3B, according to an embodiment of the invention.

FIG. 4 illustrates a block diagram of a computing apparatus 400 configured to implement or execute the methods 200 and 300 depicted in FIGS. 2, 3A and 3B, according to an example. In this respect, the computing apparatus 400 may be used as a platform for executing one or more of the functions described hereinabove with respect to the computing apparatus 102.

The computing apparatus 400 includes a processor 402 that may implement or execute some or all of the steps described in the methods 200 and 300, and may thus be equivalent to the controller 106. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the methods 200 and 300 may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. It should also be apparent that one or more of the components depicted in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A computer-implemented method of estimating a replacement cost associated with an existing technology, the method comprising:

obtaining a plurality of costs associated with implementing the existing technology, wherein the plurality of costs include an exergy cost and a utility cost associated with implementing the existing technology;

identifying a length of time that the existing technology is predicted to have remaining to perform useful work;

calculating, by a processor, a total useful work that the existing technology is predicted to have remaining in the identified length of time as a product of the identified length of time, the useful work produced by the existing technology over a predetermined period of time, and a first weighting coefficient that is selected as a function of operation policy, wherein the operation policy includes a measure of functional criticality of the existing technology; and calculating, by the processor, an existing net benefit of continuing implementation of the existing technology based upon the obtained plurality of costs and the calculated total useful work that the existing technology is predicted to have remaining, wherein calculating the existing net benefit comprises:

calculating the existing net benefit as a function of the calculated total useful work and a cost of operation of the existing technology, wherein the cost of operation of the existing technology is a product of the identified length of time, a direct operational cost of the existing technology, and a second weighting coefficient for cost that is selected as a function of operation policy; and displaying, by the processor, the calculated existing net benefit and a recommendation indicating whether to replace the existing technology.

2. The method according to claim 1, further comprising:
identifying the direct operational cost of the existing technology per unit time.

3. The method according to claim 2, wherein calculating the existing net benefit further comprises calculating the existing net benefit as a function of a third weighting coefficient that is selected as a function of operation policy.

4. The method according to claim 3, further comprising:
determining whether the identified length of time that the existing technology is predicted to have remaining results in an optimized existing net benefit calculation;
in response to a determination that the identified length of time that the existing technology is predicted to have remaining fails to result in an optimized existing net benefit calculation, performing iterations to identify an optimized length of time that results in the optimized existing net benefit; and
calculating the existing net benefit using the optimized length of time.

5. The method according to claim 4, further comprising:
calculating a new net benefit of at least one of procuring and implementing a new technology to replace the existing technology;
determining whether the new net benefit exceeds the existing net benefit; and
selecting to replace the existing technology at the optimized length of time in response to the existing net benefit exceeding the new net benefit.

6. The method according to claim 5, further comprising:
determining whether the new technology results in an optimized new net benefit calculation;
in response to a determination that the new technology fails to result in an optimized new net benefit calculation, performing one or more iterations to identify an alternative new technology results in the optimized new net benefit;
selecting one of the existing technology and the new technology that resulted in the optimized new net benefit based upon the determination of whether the optimized new net benefit exceeds the existing net benefit.

7. The method according to claim 5, further comprising:
identifying an alternative new technology in response to a determination that an alternative new technology is available;
obtaining a plurality of costs associated with at least one of procuring and implementing the alternative new technology;
calculating an alternative new net benefit of at least one of procuring and implementing the alternative new technology based upon the obtained plurality of costs;
determining whether the alternative new net benefit exceeds the existing net benefit; and
selecting one of the existing technology and another alternative new technology based upon the determination of whether the alternative new net benefit exceeds the existing net benefit.

8. The method according to claim 1, further comprising:
obtaining a plurality of costs associated with at least one of procuring and implementing a new technology to replace the existing technology, wherein the plurality of costs include a utility cost associated with at least one of procuring and implementing the new technology;
calculating a new net benefit of at least one of procuring and implementing the new technology based upon the obtained plurality of costs associated with at least one of procuring and implementing a new technology;
determining whether the existing net benefit exceeds the new net benefit; and
determining whether to replace the existing technology with the new technology based upon whether the existing net benefit exceeds the new net benefit.

9. The method according to claim 8, further comprising:
identifying a length of time predicted to be required in obtaining the new technology, wherein obtaining the plurality of costs further comprises identifying a length of time that the existing technology is predicted to have remaining to perform useful work, and wherein calculating the new net benefit further comprises calculating a total useful work that the new technology is predicted to have over the identified length of time that the existing technology is predicted to have remaining to perform the useful work.

10. The method according to claim 9, further comprising:
identifying a cost of implementing the new technology;
identifying a cost of operation of the new technology in performing the total useful work;
identifying a disposal cost associated with disposing the existing technology; and
wherein calculating the new net benefit further comprises calculating a total cost of at least one of procuring and implementing the new technology as a function of the identified cost of implementing the new technology, the identified cost of operation of the new technology in performing the total useful work, the identified disposal cost associated with disposing the existing technology, and the length of time that the existing technology is predicted to have remaining to perform useful work.

11. The method according to claim 10, wherein calculating the new net benefit further comprises calculating the new net benefit as a function of the calculated total useful work, the cost of operation of the new technology, and at least one weighting coefficient that is selected as a function of operation policy.

12. A non-transitory computer readable storage medium on which is embedded a computer program to implement a method to estimate a replacement cost associated with an existing technology, the computer program comprising a set of instructions executable by a processor to:

obtain a plurality of costs associated with implementing the existing technology, wherein the plurality of costs include an exergy cost and a utility cost associated with implementing the existing technology;

identify a length of time that the existing technology is predicted to have remaining to perform useful work;

calculate a total useful work that the existing technology is predicted to have remaining in the identified length of time as a product of the identified length of time, the useful work produced by the existing technology over a predetermined period of time, and a first weighting coefficient that is selected as a function of operation policy, wherein the operation policy includes a measure of functional criticality of the existing technology;

calculate an existing net benefit of continuing implementation of the existing technology based upon the obtained plurality of costs and the calculated total useful work that the existing technology is predicted to have remaining, wherein calculating the existing net benefit comprises calculating the existing net benefit as a function of the calculated total useful work and a cost of operation of the existing technology, wherein calculating the existing net benefit comprises calculating a cost of operation of the existing technology as a product of the identified length of time, a direct operational cost of the existing technology, and a second weighting coefficient for cost that is selected as a function of operation policy;

obtain a plurality of costs associated with at least one of procuring and implementing a new technology to replace the existing technology, wherein the plurality of costs associated with at least one of procuring and implementing the new technology include an exergy cost and a utility cost associated with at least one of procuring and implementing the new technology;

calculate a new net benefit of at least one of procuring and implementing the new technology based upon the obtained plurality of costs associated with at least one of procuring and implementing a new technology;

determine whether the existing net benefit exceeds the new net benefit; and determine whether to replace the existing technology with the new technology based upon whether the existing net benefit exceeds the new net benefit.

* * * * *

UNITED STATES PATENT AND TRADEMARK OFFICE
CERTIFICATE OF CORRECTION

PATENT NO. : 8,452,626 B2  
APPLICATION NO. : 12/538454  
DATED : May 28, 2013  
INVENTOR(S) : Amip J. Shah et al.

Page 1 of 1

It is certified that error appears in the above-identified patent and that said Letters Patent is hereby corrected as shown below:

In the Claims

In column 14, line 9, in Claim 6, after "performing" delete "one or more".

In column 14, line 12, in Claim 6, below "benefit;" insert -- determining whether the optimized new net benefit exceeds the existing net benefit; and --.

In column 14, line 36, in Claim 8, after "include" insert -- an exergy cost and --.

Signed and Sealed this  
Fifth Day of November, 2013

Teresa Stanek Rea  
*Deputy Director of the United States Patent and Trademark Office*